US008732384B1

(12) United States Patent
Scharam et al.

(10) Patent No.: US 8,732,384 B1
(45) Date of Patent: May 20, 2014

(54) METHOD AND APPARATUS FOR MEMORY ACCESS

(75) Inventors: Eran Scharam, Haifa (IL); Costia Parfenyev, Netanya (IL); Liron Ain-Kedem, St. Tivon (IL); Ophir Turbovich, Haifa (IL); Tuval Berler, Haifa (IL)

(73) Assignee: CSR Technology Inc., San Jose, CA (US)

( * ) Notice: Subject to any disclaimer, the term of this patent is extended or adjusted under 35 U.S.C. 154(b) by 501 days.

(21) Appl. No.: 12/841,059

(22) Filed: Jul. 21, 2010

Related U.S. Application Data (60) Provisional application No. 61/231,130, filed on Aug. 4, 2009.

(51) Int. Cl.
*G06F 13/00* (2006.01)

(52) U.S. Cl.
USPC ........... 711/100; 711/111; 711/112; 711/113; 711/115; 711/118; 711/131; 711/149; 711/151; 711/170; 711/171; 711/172; 711/173

(58) Field of Classification Search
USPC ......... 711/100, 111, 112, 113, 115, 118, 131, 711/149, 151, 170–173, E12.001; 345/534, 345/536
See application file for complete search history.

(56) References Cited

U.S. PATENT DOCUMENTS

| | | | |
|---|---|---|---|
| 5,581,310 A | 12/1996 | Vinekar et al. | |
| 6,067,321 A | 5/2000 | Lempel | |
| 6,163,576 A | 12/2000 | Lempel | |
| 6,178,203 B1 | 1/2001 | Lempel | |
| 6,486,884 B1 * | 11/2002 | Aleksic et al. | 345/571 |
| 6,496,199 B1 | 12/2002 | Peng et al. | |
| 6,720,978 B2 | 4/2004 | Peng et al. | |
| 6,928,516 B2 * | 8/2005 | Reuter | 711/118 |
| 7,277,100 B2 | 10/2007 | Hellman | |
| 7,401,177 B2 * | 7/2008 | Takeda et al. | 711/5 |
| 7,420,567 B2 | 9/2008 | Ju et al. | |
| 7,617,354 B2 * | 11/2009 | Oh | 711/105 |
| 2004/0003117 A1 * | 1/2004 | McCoy et al. | 709/246 |
| 2004/0061704 A1 | 4/2004 | Ju et al. | |
| 2005/0195902 A1 | 9/2005 | Chung | |
| 2006/0050976 A1 | 3/2006 | Molloy | |
| 2007/0086522 A1 | 4/2007 | Mutz et al. | |
| 2010/0026697 A1 | 2/2010 | Xiang et al. | |

OTHER PUBLICATIONS

Bruno Zatt et al. H.264/AVC HDTV Motion Compensation Soft IP, Jun. 4, 2009, downloaded from http://www.design-reuse.com/articles/18642/h264-avc-hdtv-motion-compensation-soft-ip.html.

* cited by examiner

*Primary Examiner* — Arpan P. Savla
*Assistant Examiner* — Zhuo Li
(74) *Attorney, Agent, or Firm* — Pillsbury Winthrop Shaw Pittman LLP (57) ABSTRACT

A device and methods are provided for accessing memory. In one embodiment, a method includes receiving a request for data stored in a device, checking a local memory for data based on the request to determine if one or more blocks of data associated with the request are stored in the local memory, and generating a memory access request for one or more blocks of data stored in a memory of the device based when one or more blocks of data are not stored in the local memory. In one embodiment, data stored in memory of the device may be arranged in a configuration to include a plurality of memory access units each having adjacent lines of pixel data to define a single line of memory within the memory access units. Memory access units may be configured based on memory type and may reduce the number of undesired pixels read.

24 Claims, 8 Drawing Sheets

METHOD AND APPARATUS FOR MEMORY ACCESS

CROSS-REFERENCE TO RELATED APPLICATION

This application claims the benefit of U.S. Provisional Application No. 61/231,130, filed Aug. 4, 2009.

FIELD OF THE INVENTION

The present invention relates in general to methods and devices for memory access and in particular to accessing memory while optimizing memory bandwidth.

BACKGROUND

For many devices, external memory bandwidth may determine overall performance of a system. Memory bandwidth may relate to an amount of data which may be communicated relative to memory. Memory access for a dynamic random access memory (DRAM) for example, may be limited to a burst length that defines the access requests to a memory. The size of a memory bursts and access rate can effect bandwidth. Access to the memories, such as a DRAM memory may be limited by the memory data width and bursts lengths defining memory access.

For conventional image processing devices many conventional devices typically store image data in external memory as two-dimensional arrays, similar to eventual display of an image. Access to image data based on the conventional arrangement of data in memory can increase demands of external memory bandwidth resulting in overhead of memory. Overhead generated by access to data, such as image data, may lead to delayed processing speed, loading of unnecessary data, and a potentially a bandwidth burden.

Figure 1:
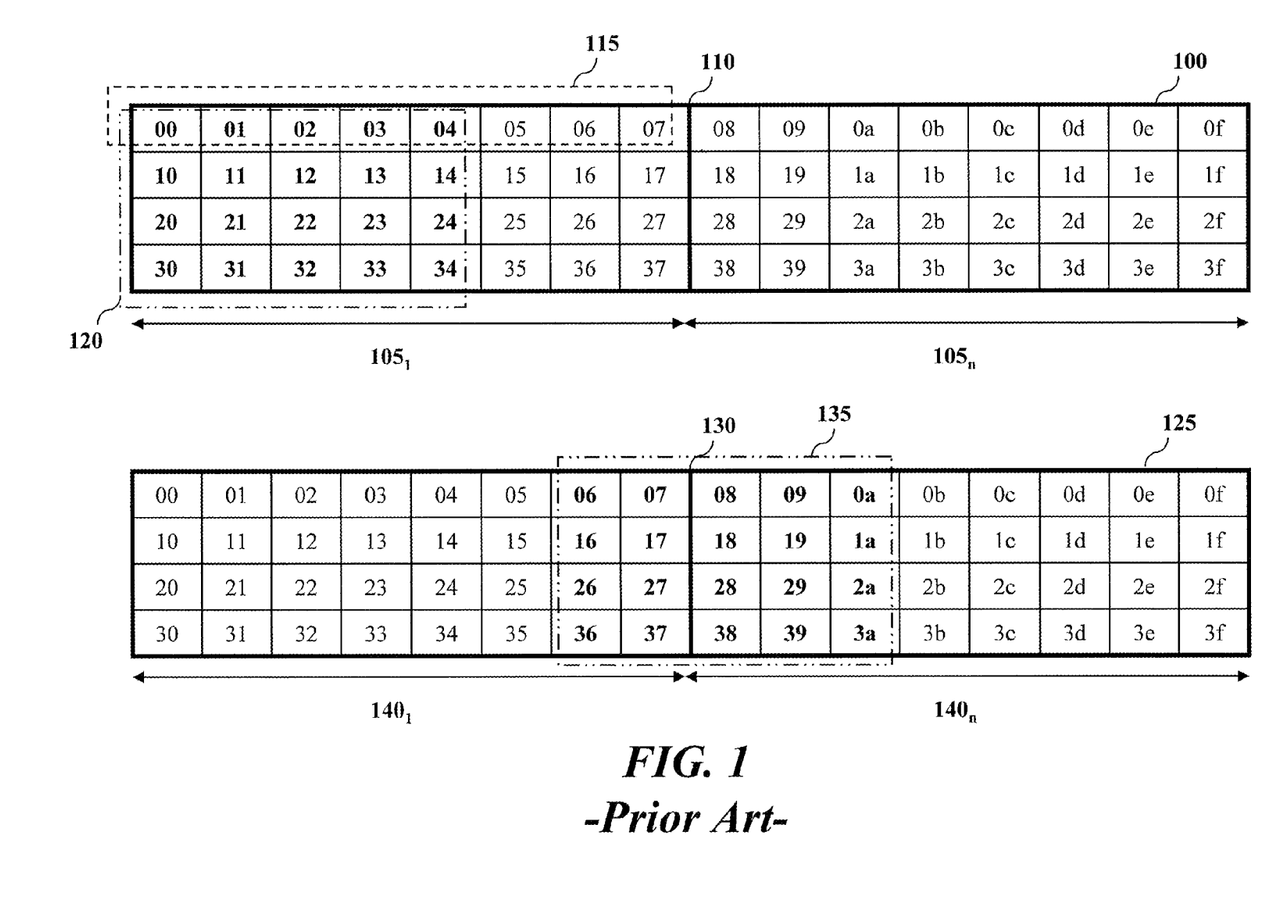
FIG. 1 depicts a graphical representation of memory segments.

Conventional methods of writing data to memory typically structure memory entry with boundaries, wherein data may be aligned with a boundary. However, in many cases access to memory entries may not be aligned to boundaries. FIG. 1 illustrates a graphical representation of reference data blocks employed by conventional methods and devices for memory access. Memory segment 100 includes a plurality of segments, shown as $105_{1-n}$, wherein the segments may be separated by boundaries 110. Typically, conventional methods read data from memory by a block of values shown as 115. In order to read a block of five pixels over four lines, shown by 120 of memory segment 100, one block must be read for eight pixels per line with a total of four lines. When desired data is not aligned with a boundary, such as boundary 130 and data shown by 135 of segment 125, blocks of data are required to be read from segments $140_1$ and $140_n$. As a result, the amount of memory required for accessing the data is doubled, resulting in a 100% increase in overhead. Memory overhead may further worsen when memory blocks are reduced in size using the conventional methods.

Accessing data from a memory may additionally create bandwidth burden when non-boundary aligned requests are made repeatedly. Conventional methods and devices typically perform memory access requests for data despite recent or previous memory requests. As a result, bandwidth requirements of the memory requests can reduce overall system performance. Accordingly, there is a need in the art for improved memory access which overcomes one or more of the aforementioned drawbacks.

BRIEF SUMMARY OF THE INVENTION

Disclosed and claimed herein are a device and methods for accessing memory. In one embodiment, a method includes receiving a request, by a processor, for data stored in a device, said data having one or more blocks, and checking a local memory for the one or more blocks of data based on the request to determine if the one or more blocks of data associated with the request are stored in the local memory. The method may further include generating a memory access request, by the processor, for one or more blocks of data stored in a memory of the device based on said checking act and the request for data when one or more blocks of data are not stored in the local memory, wherein data stored in the memory of the device is arranged in a configuration comprising a plurality of memory access units each comprising adjacent lines of pixel data to define a single line of memory within the memory access units being configured for minimizing memory overhead for accessing data to optimize memory bandwidth. The method may further include receiving data from the memory of the device based on said memory access request, the received data associated with one or more minimum memory access units arranged in the configuration for minimizing memory overhead, and storing, by the processor, the received data in the local memory.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Overview and Terminology

One aspect of the present invention relates to optimizing memory bandwidth to minimize memory overhead during memory access. In one embodiment, a method is provided for storing data in memory using a bandwidth optimized format (BOF). In one embodiment, the BOF may employ minimum memory access (MMA) units for arranging memory into a segment. Access to memory may be based on one or more blocks of data associated with the segment. According to another embodiment, data may be arranged in a memory segment for a plurality of memory types and bit contents. For example, a minimum memory access (MMA) unit may be employed to generate memory segments for one of 64 bit, 128 bit, and 256 bit content, wherein arrangement of the data may be based on the bit content employed. In one embodiment, memory segments may be associated with memory burst lengths based on the memory type.

Another aspect of the invention relates to accessing data from memory. In one embodiment, a process is provided for accessing memory based on one or more requests for data. The process may include checking local memory of a device for data associated with previous requests. In that fashion, memory access requests may be limited to data which is not stored by cache memory of the device, or local memory. As a result, memory utilization may be optimized.

According to one embodiment, a device may be configured to access to memory for data. For example, memory access may be associated with access for image data according to a bandwidth optimized format. The device may further allow for determining if requests for data may be minimized based on data stored by local memory. In certain embodiments, the device may relate to an imaging device.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that can be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits When implemented in software, the elements of the invention are essentially the code segments to perform the necessary tasks. The code segments can be stored in a "processor storage medium," which includes any medium that can store information. Examples of the processor storage medium include an electronic circuit, a semiconductor memory device, a ROM, a flash memory or other non-volatile memory, a floppy diskette, a CD-ROM, an optical disk, a hard disk, etc.

Exemplary Embodiments

Figure 2:
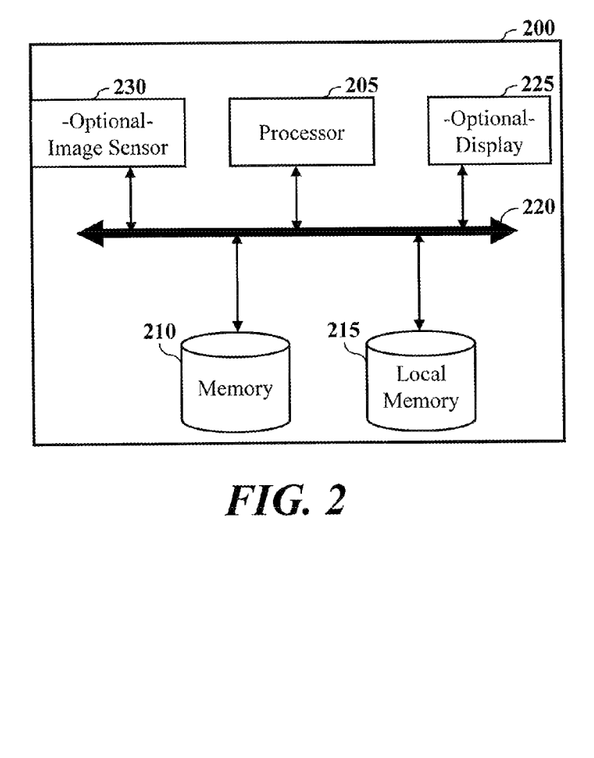
FIG. 2 depicts a simplified block diagram of a device according to one embodiment of the invention.

Referring now to the figures, FIG. 2 depicts a simplified block diagram of device according to one embodiment of the invention. Device 200 may be configured to fulfill one or more memory requests including read and write requests. As depicted in FIG. 2, device 200 includes processor 205 coupled to memory 210, local memory 215 and display 225 via bus 220. Processor 205 may be implemented using one of an integrated circuit microprocessor, microcontroller, digital signal processor and processor in general. Processor 205 may be configured to process received data and/or access memory based on processor-executable instructions.

Memory 210 may relate to any combination of different memory storage devices, such as a hard drive, random access memory (RAM), read only memory (ROM), flash memory, or any other type of volatile and/or nonvolatile memory. It should further be appreciated that memory 210 may be implemented as multiple or discrete memories for storing processed image data, as well as the processor-executable instructions for processing the captured image data. Further, memory 210 may include removable memory, such as flash memory, for storage of image data. In one embodiment, memory 210 may be configured to store data according to a bandwidth optimized format. For example, memory may be arranged based on the minimum memory access (MMA) unit and bit configuration employed. Local memory 215 may relate to cache memory for use by processor 205. In one embodiment, memory 210 may relate to one or more of double data rate synchronous dynamic random access memory (DDR SDRAM), double-data-rate three synchronous dynamic random access memory (DDR3 SDRAM) and dynamic random access memory (DRAM) in general. Similarly, local memory 215 may relate to static random access memory (SRAM). However, it should be appreciated that memory 210 and local memory 215 may be associated with other types of memory. In certain embodiments, BOF employed for memories including DDR2 and DDR3 may improve utilization of memory bandwidth. For example, BOF may allow for bypassing the limitations of DDR memory access due to minimal burst length.

In certain embodiments, device 200 may relate to an imaging device, such as a digital camera. Accordingly, device 200 may include optional image sensor 230. Optional image sensor 230 may include light detection circuitry (e.g., CMOS integrated circuit, etc.) for detection of image data. Image data detected by optional image sensor 230 may be provided to processor 205 and stored by memory 210 and/or memory 215. In one embodiment, processed image data may be stored in memory 210 and/or provided to display 225 for viewing.

Optional display 225 may relate to a liquid crystal display (LCD) incorporated into device 200 for display of data, such as captured image data. Alternatively, it should be appreciated that an external display device may be coupled to device 200 for display. In certain embodiments, device 200 may include a memory interface (not shown in FIG. 2) for interfacing with memory 210 and memory 215. As will be described in more detail below, the memory interface may be configured to access memory of the device.

Although FIG. 2 has been described above with respect to an imaging device, it should be appreciated that the device may relate to other devices, such as a personal communication device, display devices (e.g., digital photo viewer, display, etc.), and memory devices in general. Further, it should also be appreciated that the device of FIG. 2 may relate to, or be included in, other devices, such as a mobile communication device and portable communication devices in general.

Figure 3:
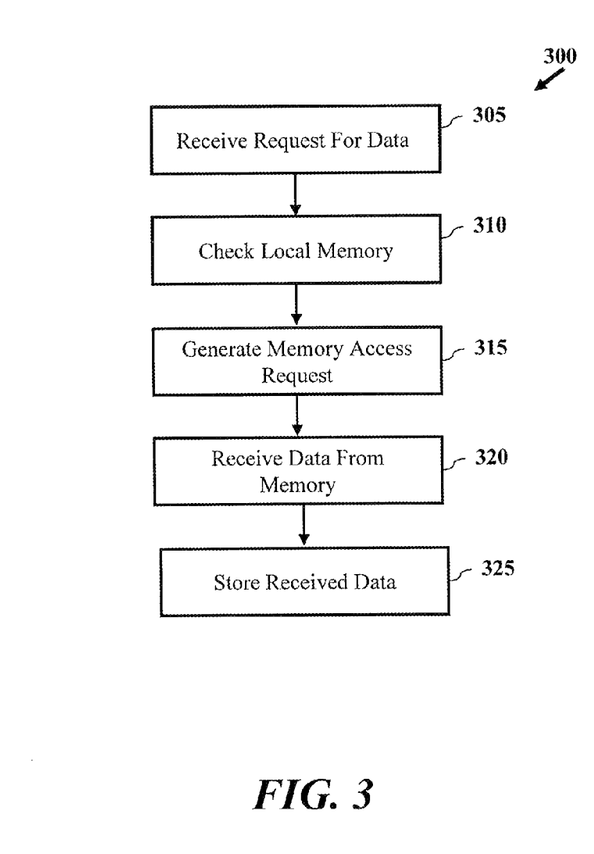
FIG. 3 depicts a process for memory access according to one or more embodiments of the invention.

Referring now to FIG. 3 a process is depicted for memory access by a device according to one or more embodiments of the invention. Process 300 may be performed by one or more elements of the device of FIG. 2 (e.g., device 200). According to another embodiment, process 300 may employed for access to data of a memory by a processor (e.g., processor 205). Process 300 may be employed for accessing data for video compression (e.g., MPEG2, MPEG4, WMV, VC-1, h.264, etc.) wherein reference blocks may be employed for accessing data from memory. For example, accessing memories such as SDRAM, DDR1, DDR2, DDR3, and DRAM memories in general.

Process 300 may be initiated by receiving a request for data stored in a memory of a device at block 305. According to one embodiment, the data requested at block 305 may relate to one or more blocks of data associated with an image and/or image data in general.

At block 310, local memory (e.g., memory 215) of a device may be for one or more blocks of data based on the request to determine if data associated with the request is stored in the local memory. In one embodiment, checking local memory may include checking for overlap of data associated with the request and data stored in the local memory associated with previously received requests, or with requests being processed which their requested data has not yet been received.

A memory access request may be generated at block 315 for one or more blocks of data stored in a memory of the device based on checking at block 310 and the request for data when the data is not stored in the local memory and further not in the process of being fetched. The memory access request may be directed to a memory external of the processor (e.g., memory 210). In one embodiment, data stored in memory of the device may be arranged to optimize memory bandwidth. As will be described in more detail below, optimized memory bandwidth may relate to minimization of memory overhead associated with access of data from a memory. Data may be arranged in a configuration to minimize memory overhead associated with access of the data to optimize memory bandwidth. In one embodiment, data stored in the memory is arranged based on a minimum memory access unit. The configuration of minimum memory access units may be based on adjacent lines of pixel data to define a single line of the minimum memory access unit configuration. The memory access unit may relate to two consecutive rows of four pixels are arranged as one line of a memory block. Alternatively, the minimum memory access unit may relate to four consecutive rows of four pixels arranged as one line of a memory block. In one embodiment, a memory access unit configuration may comprise a plurality of memory access units each comprising adjacent lines of pixel data to define a single line of memory within the memory access units being configured for minimizing memory overhead for accessing data to optimize memory bandwidth.

At block 320, the processor may receive data from the memory of the device based on said memory access request, wherein one or more blocks of data associated with a minimum memory access unit are received. Based on the received data, the processor may store the data in the local memory at block 325.

Figure 4:
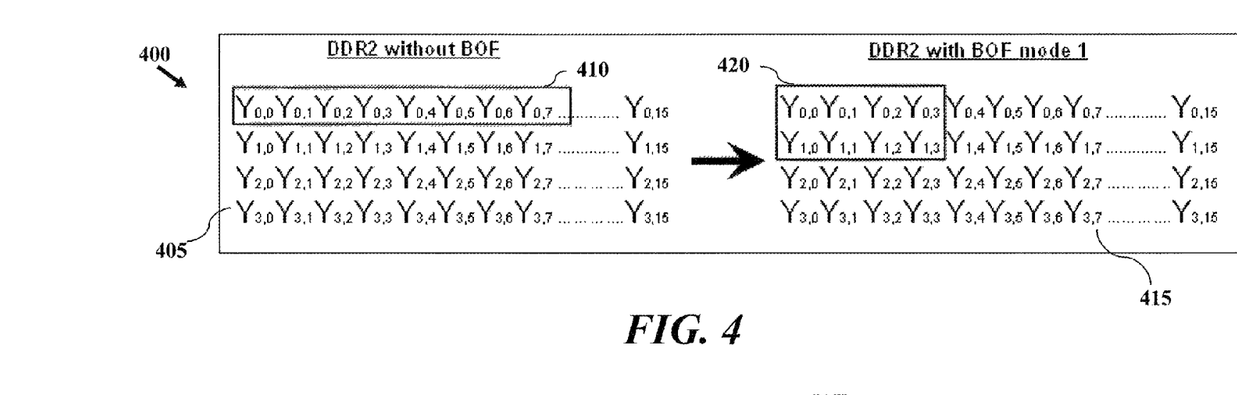
FIG. 4 depicts a graphical representation of a minimum memory access (MMA) unit according to one embodiment of the invention.

Referring now to FIG. 4, a graphical representation of a minimum memory access (MMA) unit is depicted according to one embodiment of the invention. In one embodiment, a device (e.g., device 200) may employ bandwidth optimization format (BOF) for organization of data in external memory to reduce overhead. FIG. 4 depicts image data stored by an external memory as a two dimensional array, shown as 405. Memory block 410 is illustrated for a MMA unit which does not employ bandwidth optimized format. MMA unit 420 is depicted for a selection of data 415 based on a bandwidth optimized format according to one embodiment of the invention. Data stored in a memory to optimize memory bandwidth relates to storage of data based on a MMA unit configured based on the capacity of the memory type. FIG. 4 illustrates 64 bit content according to one embodiment of the invention. By selecting pixels for an MMA unit as depicted in FIG. 4 with a bandwidth optimized format, the number of undesired pixels read with each MMA may be reduced. Reading data based on a BOF according to the invention can reduce the number of memory blocks required to read data. Arranging data in a BOF can further reduce read bandwidth in worst-case scenarios by 24.5% and non-worst case scenarios by 15-25% in certain embodiments.

Typically, as memory devices become faster, the minimal memory access becomes larger. For example a minimum burst length may increase from four to eight when using DDR2 to DDR3. Further, DDR3 memory may be targeted to operate at higher clock frequencies. Accordingly, overhead can not be solved by simply upgrading memory.

Figure 5:
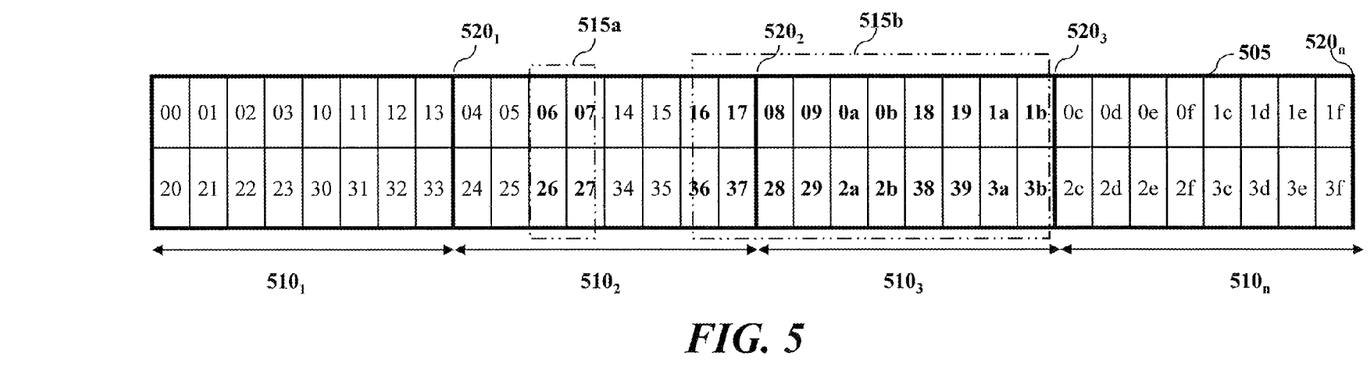
FIG. 5 depicts a graphical representation of a memory segment according to one embodiment of the invention.

Referring now to FIG. 5, an arrangement of desired pixels according to a bandwidth optimization format (BOF) is depicted for data of FIG. 1 (e.g., data 115) according to an exemplary embodiment. By selecting MMA units, data may be stored as a memory segment, shown as 505. Memory segment 505 may include a plurality of segments $5101_{1-n}$, each segment separated by boundaries, shown as $520_{1-n}$. According to one embodiment, access for data may be associated with one or more boundaries. Thus, to access desired data of FIG. 1 (e.g., data 115), shown as 515a and 515b, only two segments are required to be read. In this case, two MMAs per line, $510_2$ and $510_3$, for a total of four (4) MMA units. In contrast, organization of image data based on conventional methods required the equivalent of eight (8) MMA units.

Figure 6:
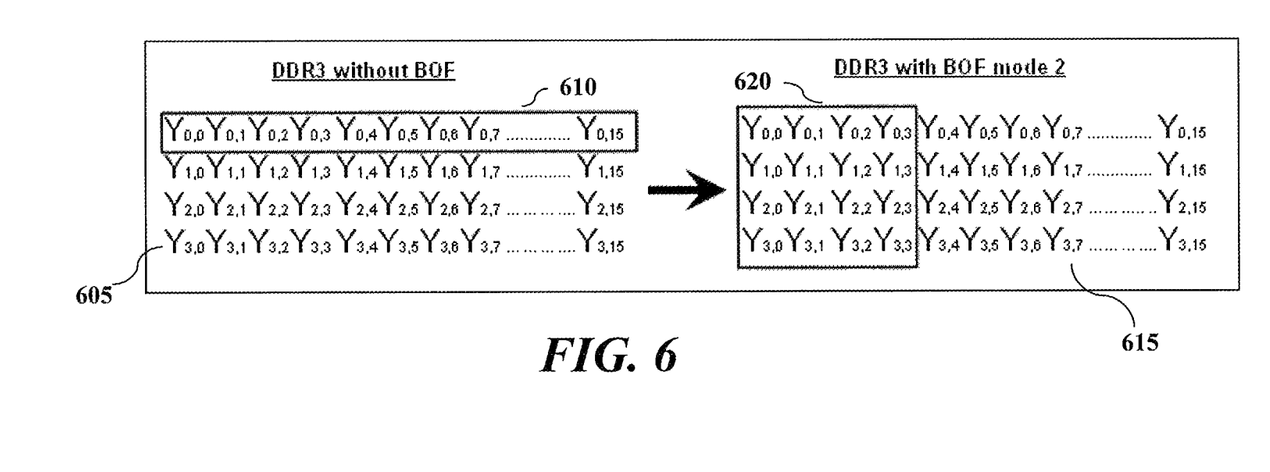
FIG. 6 depicts a graphical representation of minimum memory access unit according to another embodiment of the invention.

Referring now to FIG. 6, a graphical representation of minimum memory access (MMA) unit is depicted according to another embodiment of the invention. FIG. 6 illustrates image data stored by an external memory as a two dimensional array for 128 bit content. Data 605 is illustrated for data which does not employ bandwidth optimized format, rather a memory block shown as 610. MMA unit 620 is illustrated for data 615 based on a bandwidth optimized format (BOF) according to one embodiment of the invention. By selecting pixels for an MMA unit as depicted in FIG. 6 with a BOF, the number of undesired pixels read with each MMA may be reduced. As depicted four pixels of four consecutive lines are grouped into one MMA unit.

Figure 7:
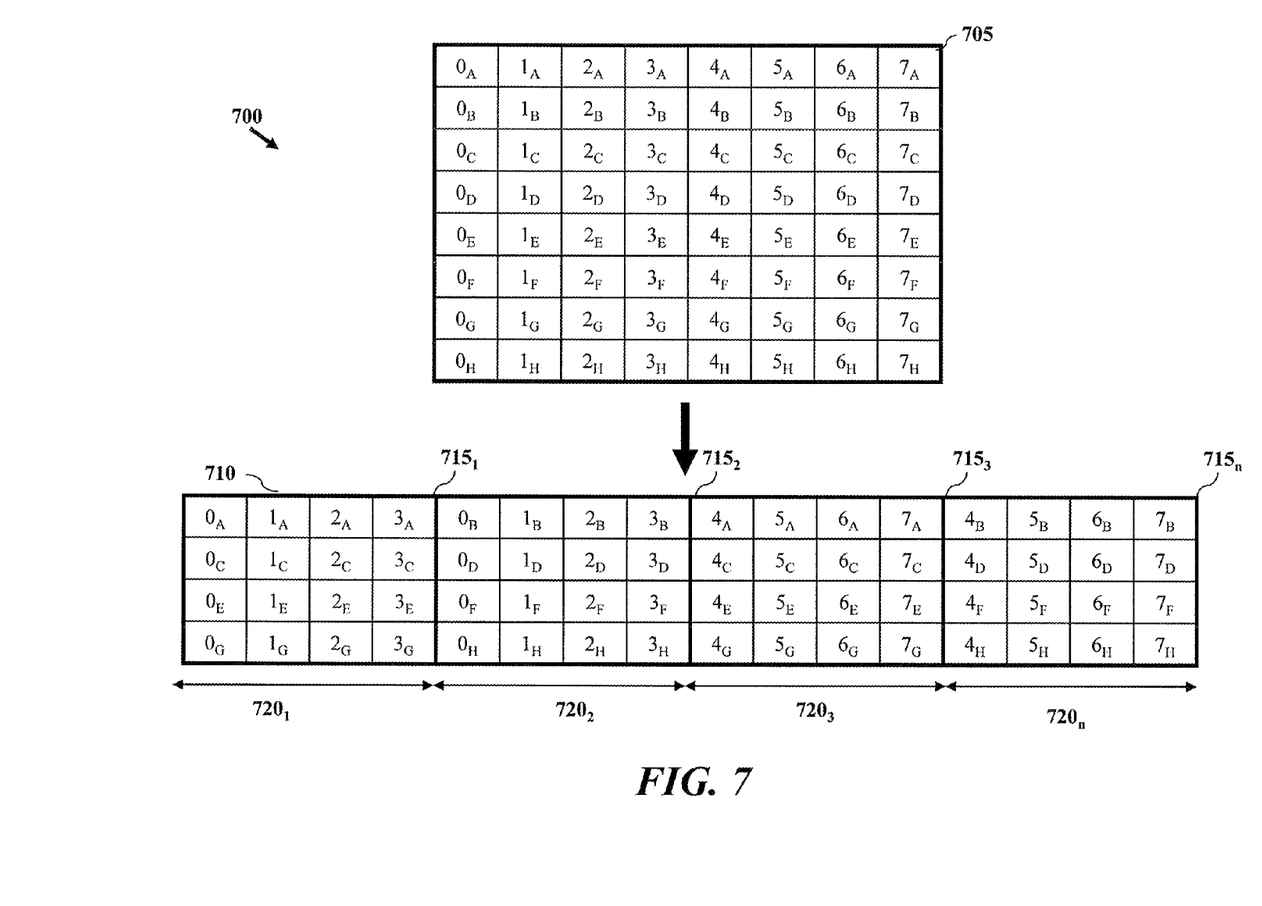
FIG. 7 depicts a memory segment based on the minimum memory access (MMA) unit of FIG. 4 according to one embodiment of the invention.

Referring now to FIG. 7, a graphical representation is depicted of a memory segment based on the minimum memory access (MMA) unit of FIG. 4 according to one embodiment of the invention. FIG. 7 illustrates image data organization of a two dimensional data array, such as image data to be stored by an external memory, to optimize bandwidth for a two dimensional array for 64 bit content. Two dimensional image array 705 is depicted for data associated with an image according to one embodiment as provided by an image sensor. Employing a MMA unit for 64 bit arrangement of the data may be arranged as shown by memory segment 710. Rows of data 705 are indicated by an associated letter for purposes of illustration. Accordingly, the BOF arrangement of memory segment 710 includes one or more row identifiers. Memory segment 710 depicts data arranged based on a minimum memory access unit wherein two consecutive rows of four pixels are arranged as one line of a memory block. Boundaries of memory blocks may be denoted by $715_{1-n}$. Further, access block widths are depicted as $720_{1-n}$ based on boundaries $715_{1-n}$.

Figure 8:
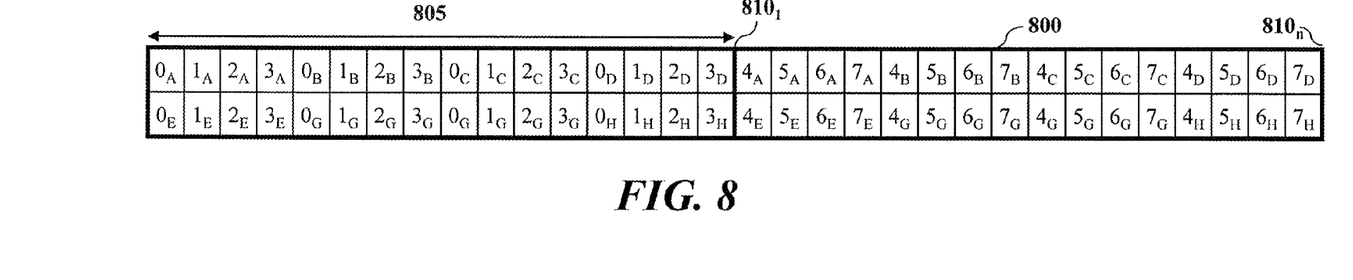
FIG. 8 depicts memory segment storage for arranging data for MMA units of a 128 bit system according to one embodiment of the invention.

Referring now to FIG. 8, memory segment storage is depicted for arranging data for MMA units of a 128 bit system. For example, data elements may be arranged in a memory segment shown as 800 related to MMA unit 605 of FIG. 6. A minimum access block is depicted as 805, wherein boundaries of memory blocks may be denoted by $810_{1-n}$ BOF arrangement in this mode may reduce the reference bandwidth by 38.9% in some instances. The bandwidth in other non-worst case scenarios may be reduced by 25%-50%.

Figure 9:
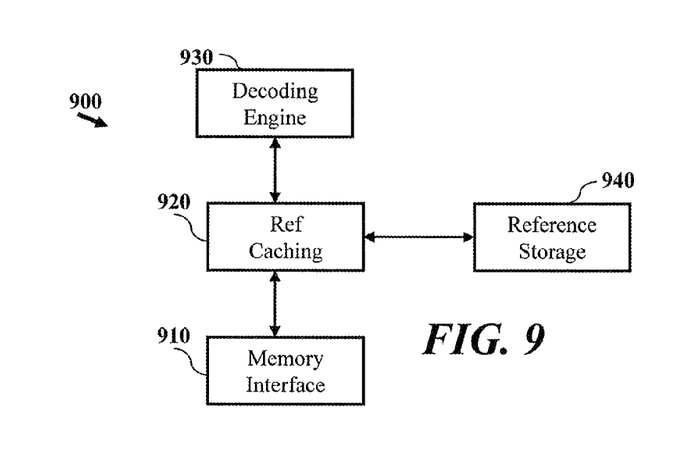
FIG. 9 depicts a graphical representation of functions performed by a processor according to one embodiment of the invention.

Referring now to FIG. 9, a graphical representation of functions performed by a processor (e.g., processor 205) are depicted according to one or more embodiments of the invention. According to one embodiment, processor functions may include memory interface function 110 to enable access to an external memory when necessary. For example, memory interface function 910 may be configured to arbitrate one or more read and write requests to memory of a device. Reference caching function 920 may be configured to handle requests for data from decoding engine 930. The reference caching function 920 may then determine if data associated with a request and/or if a portion thereof resides in the reference storage 940. For example, checking of reference storage may be based on previous requests made for access of the data. When the data is determined to be entirely available, if in fact in local memory or in transition thereto due to a pending request for the data, then it is provided to the decoding engine 930 either from the local memory or when the data is received from memory. As a result, once data is stored in local memory, there may be no need to access the memory again to fulfill the request. However, if the entire data for a request is not stored, memory interface 910 may generate a request for the missing data portions from the external memory.

Data that is received may be provided on a block basis to the decoding engine 930, and may further be stored in the reference storage 940 for future use. If partial data resides in the reference storage 940, then an altered data request from the external memory may be made via memory interface 910 for one or more data blocks that are missing. Received data may be stored in reference storage 940 and the entire block can be now provided to the decoding engine 930.

While a specific example was discussed hereinabove, a person skilled-in-the-art would readily realize that other memories, memory sizes, burst sizes, block sizes, etc., and may be used without departing from the scope of the invention and these are included herein. The reference storage may be implemented in a variety of forms without departing from the scope of the invention, including but not limited to, direct cache, set-associative cache, and fully associative cache.

Figure 10:
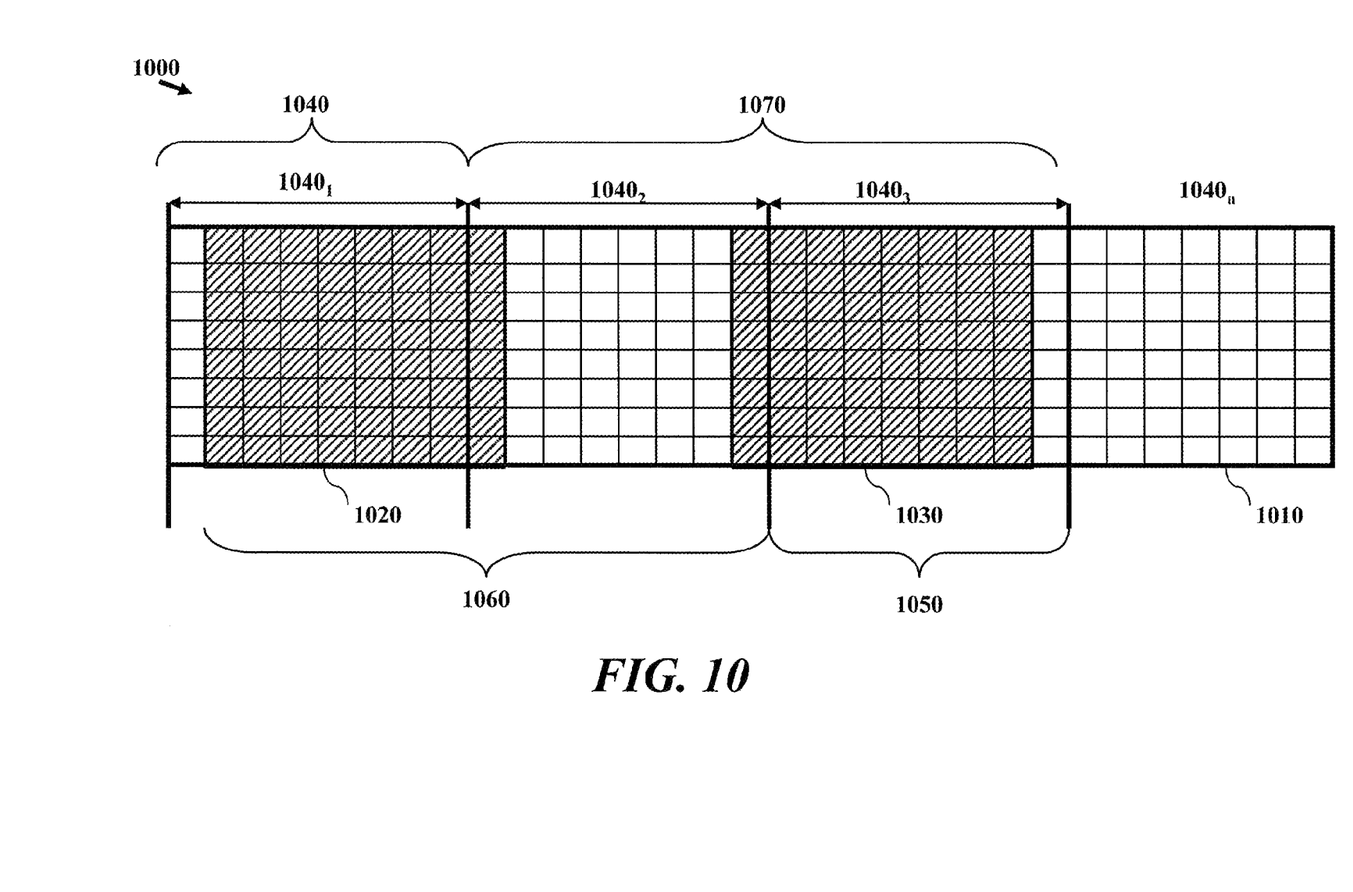
FIG. 10 depicts a graphical representation of memory access according to one embodiment of the invention.

Referring now to FIG. 10, a graphical representation is depicted of memory access according to one embodiment of the invention. Memory segment 1010 represents an exemplary arrangement for storing data. Memory segment 1010 may relate to a memory segment of external memory associated with a request for data. For example, memory 1010 may be associated with a minimum burst length, shown as 1040 of 8-bytes. Accordingly, when a decoding function of a processor (e.g., decoding function 930) requests a block of data, such as data block 1020 the decoding function may access reference caching functionality of the processor (e.g., reference caching function 920) to determine if the data already exists in local storage (e.g., reference storage 940). When local memory does not store all data associated with the request, memory interface functions (e.g., memory interface 910) may be accessed read data from memory. In order to fulfill the request for data 1020 (depicted as cross hatched portion of memory 1010, two segments must be read, segments $1040_1$ and $1040_2$.

Accordingly, necessary data for the request will be read in two bursts, one beginning at $1040_1$ the other beginning at $1040_2$. Block data 1020 may then be provided to a decoding engine (e.g., decoding engine 930). In contrast to conventional methods, data from both burst cycles may then be stored in reference storage (e.g., reference storage 940). When the decoding engine functions (e.g., decoding functions 130) request access to a second block of data, shown as 1030, the reference caching function may determine whether a portion of the data resides in the reference caching unit 940 and further determine other data may be missing. Therefore, memory interface 910 can request data from memory stored by the external device with a burst access beginning at $1040_3$. Reference caching functions of the device may then provide block 1030 to a decoding engine (e.g., decoding function 930) and store the burst received in local memory for future use. In this case, instead of two burst cycles for block 1030 only a single burst cycle is needed. In that fashion, bandwidth requirement may be reduced by 50%.

Figure 11:
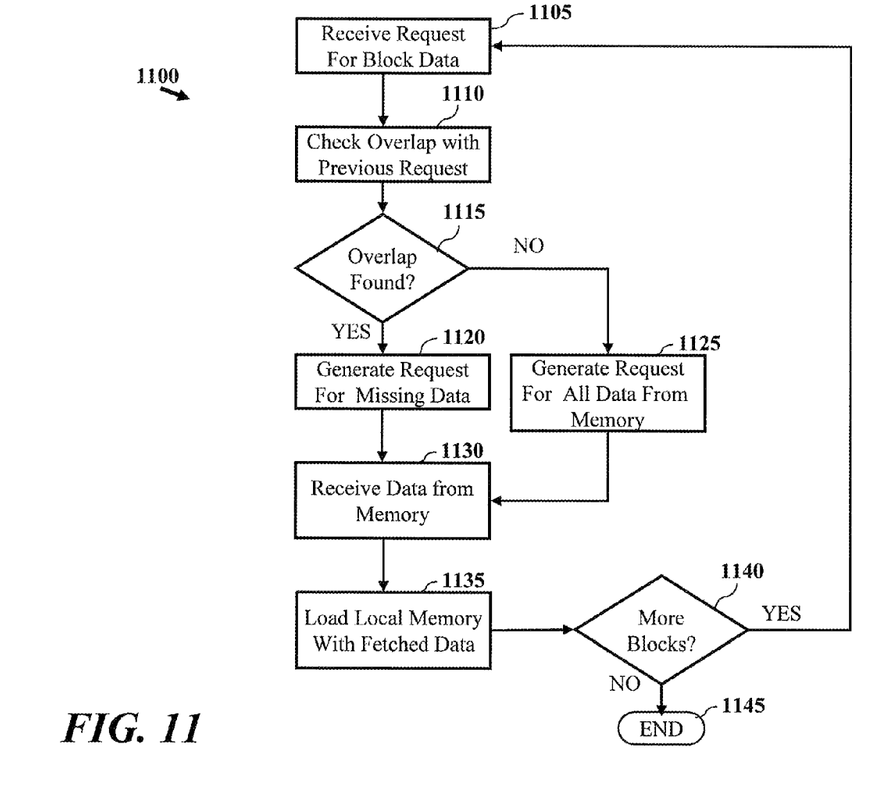
FIG. 11 depicts a process for accessing memory according to one embodiment of the invention.

Referring now to FIG. 11, a process is depicted for accessing memory according to one embodiment of the invention. Process 1100 may be initiated by receiving a request for block data at block 1105. For example, a request may be provided by a decoding engine (e.g., decoding engine 930) for data associated with an image. At block 1110, a check may be performed for overlap associated with a previous request. For example, a reference caching unit (Reference caching unit 920) may be checked for the data of the block that were previously launched. At decision block 1115 the processor of the device may determine if an overlap is found. When an overlap is found ("YES" path out of decision block 1115), the processor may generate a request for missing data at block 1120. When no overlap is found ("NO" path out of decision block 1115), the processor may generate request for memory to fulfill the request at block 1125.

At block 1130, the processor may access the memory to retrieve data based on the result of the over lap determination. It should be noted, when checking for overlap is performed it is possible that a request has been made and the data is still pending for arrival from a previous request. Thus, the processor may identify data in memory of the device while data is being accessed based on a prior request. At block 1135, local memory may then be loaded with fetched data. Thus, data responsive of a request may be provided for a data block.

Process 1100 may continue by checking if additional blocks are needed at decision block 1140. When additional blocks are to be fulfilled ("YES" path out of decision block 1140), the processor may receive additional requests at block 1105. When additional blocks are not required ("NO" path out of decision block 1140), the process terminates. Process 1100 may be adapted without departing from the scope of the invention to address different needs for efficiently addressing blocks stored in memory for the purpose of reducing bandwidth requirements. Requests, in accordance of this invention may appear and be handled at any time while the system processor waits to receive data from memory. Data may be supplied to the requesting entity once it is determined that the full block data is available for the specific request.

One advantage of the invention may be that the disclosed invention is indifferent to the arrangement of an image in memory, for example memory segment of FIG. 10. Furthermore, the local memory according to the invention may be a two-dimensional address/block-overlap caching scheme that is capable of adjusting memory requests based on future information that is expected to be received in contrast to the conventional caching schemes that may be designed to wait until data is fetched from memory before bringing additional data.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for accessing memory, the method comprising the acts of:
   receiving a request, by a processor, for data stored in a device, said data having one or more blocks;
   checking a local memory for the one or more blocks of data based on the request to determine if the one or more blocks of data associated with the request are stored in the local memory;
   generating a memory access request, by the processor, for one or more blocks of data stored in a memory of the device based on said checking act and the request for data when one or more blocks of data are not stored in the local memory, wherein data stored in the memory of the device is arranged in a configuration comprising a plurality of memory access units each comprising two or more adjacent lines of two or more pixel data, and wherein the contents of one or more of the memory access units are configured to be accessed in a single burst cycle, and wherein a bit size of the memory access units is configured based on a burst length of the single burst cycle;
   receiving data comprising all of the contents of the one or more memory access units from the memory of the device in the single burst cycle based on said memory access request, such that all of the pixel data from the two or more adjacent lines in the one or more memory access units is received in the single burst cycle; and
   storing, by the processor, the received data in the local memory.

2. The method of claim 1, wherein the request for data stored in the device relates to a request for one or more blocks of data associated with an image.

3. The method of claim 1, wherein checking local memory includes checking for overlap of data associated with the request and data stored in the local memory associated with a previously received request.

4. The method of claim 1, wherein the memory access request relates to a request for data stored in a memory external to the processor.

5. The method of claim 1, wherein optimized memory bandwidth relates to minimization of memory overhead associated with access of data from a memory.

6. The method of claim 1, wherein data stored in the memory is arranged based on a minimum memory access unit, and wherein two consecutive lines of four pixels are arranged as one line of a memory block.

7. The method of claim 1, wherein data stored in the memory is arranged based on a minimum memory access unit, and wherein four consecutive lines of four pixels are arranged as one line of a memory block.

8. The method of claim 1, wherein data stored in the memory to optimize memory bandwidth relates to storage of data based on a minimum memory access unit, the minimum memory access unit configured based on the capacity of the memory type.

9. The method of claim 1, wherein data received by the processor is associated with a block of data for a minimum memory access unit, wherein the block of data is not aligned with memory boundaries of a memory storage segment.

10. The method of claim 1, further comprising receiving a second request for data from the memory of the device, wherein less data is requested from memory based on the previous request.

11. The method of claim 1, further comprising decoding received data based on a bandwidth optimized arrangement of data in memory of the device.

12. The method of claim 1, further comprising arranging a two-dimensional image based on arrangement of bandwidth optimized memory.

13. A device, the device comprising:
    a first memory;
    a second memory; and
    a processor coupled to the first and second memories, the processor configured to:
      receive a request, by a processor, for data stored in a device, said data having one or more blocks;
      check a local memory for the one or more blocks of data based on the request to determine if the one or more blocks of data associated with the request are stored in the local memory;
      generate a memory access request for one or more blocks of data stored in a memory of the device based on said checking act and the request for data when one or more blocks of data are not stored in the local memory, wherein data stored in the memory of the device is arranged in a configuration comprising a plurality of memory access units each comprising two or more adjacent lines of two or more pixel data, and wherein the contents of one or more of the memory access units are configured to be accessed in a single burst cycle, and wherein a bit size of the memory access units is configured based on a burst length of the single burst cycle;
      receive data comprising all of the contents of the one or more memory access units from the memory of the device in the single burst cycle based on said memory access request, such that all of the pixel data from the two or more adjacent lines in the one or more memory access units is received in the single burst cycle; and
      store the received data in the local memory.

14. The device of claim 13, wherein the request for data stored in the device relates to a request for one or more blocks of data associated with an image.

15. The device of claim 13, wherein the processor checks the first memory by checking for overlap of data associated with the request and data stored in the first memory associated with a previously received request.

16. The device of claim 13, wherein the memory access request relates to a request for data stored in the second memory, wherein the second memory is external to the processor.

17. The device of claim 13, wherein optimized memory bandwidth relates to minimization of memory overhead associated with access of data from a memory.

18. The device of claim 13, wherein data stored in the memory is arranged based on a minimum memory access unit, and wherein two consecutive lines of four pixels are arranged as one of two lines of a memory block.

19. The device of claim 13, wherein data stored in the memory is arranged based on a minimum memory access unit, and wherein four consecutive lines of four pixels are arranged as one of two lines of a memory block.

20. The device of claim 13, wherein data stored in the memory to optimize memory bandwidth relates to storage of data based on a minimum memory access unit, the minimum memory access unit configured based on the capacity of the memory type.

21. The device of claim 13, wherein data received by the processor is associated with a block of data for a minimum memory access unit, wherein the block of data is not aligned with memory boundaries of a memory storage segment.

22. The device of claim 13, the processor further configured to receive a second request for data from the second memory of the device, wherein less data is requested from memory based on the previous request.

23. The device of claim 13, the processor further configured to decode received data based on a bandwidth optimized arrangement of data in memory of the device.

24. The device of claim 13, the processor further configured to arrange a two-dimensional image based on arrangement of bandwidth optimized memory.

\* \* \* \* \*

UNITED STATES PATENT AND TRADEMARK OFFICE
CERTIFICATE OF CORRECTION

| | | |
|---|---|---|
| PATENT NO. | : 8,732,384 B1 | Page 1 of 1 |
| APPLICATION NO. | : 12/841059 | |
| DATED | : May 20, 2014 | |
| INVENTOR(S) | : Scharam et al. | |

It is certified that error appears in the above-identified patent and that said Letters Patent is hereby corrected as shown below:

In the Specification

In Column 3, Line 62, delete "data bits" and insert -- data bits. --, therefor.

In Column 6, Line 29, delete "$5101_{1-n}$," and insert -- $510_{1-n}$, --, therefor.

In Column 8, Line 14, delete "reference caching unit 940" and insert -- reference caching unit 920 --, therefor.

Signed and Sealed this
Fifth Day of August, 2014

Michelle K. Lee
*Deputy Director of the United States Patent and Trademark Office*